UNITED STATES PATENT OFFICE.

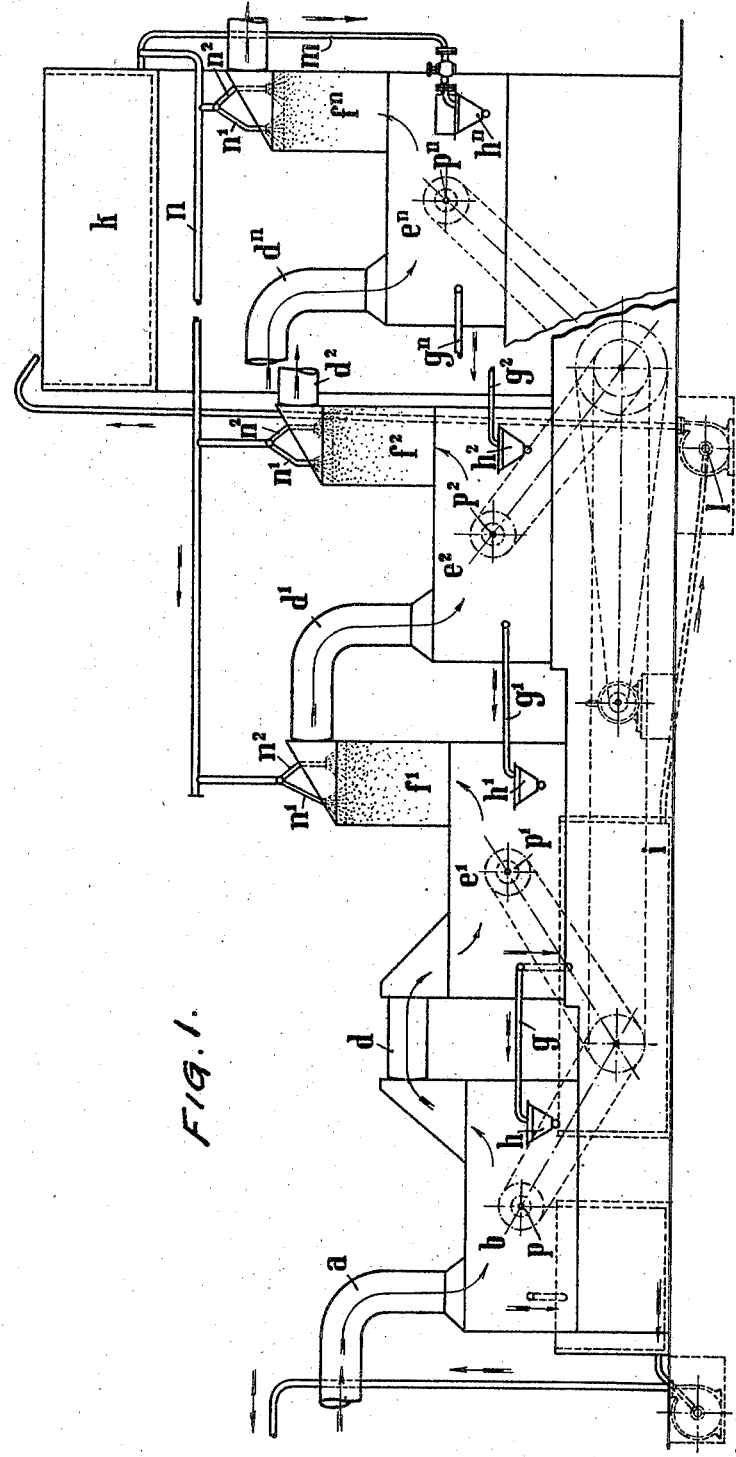

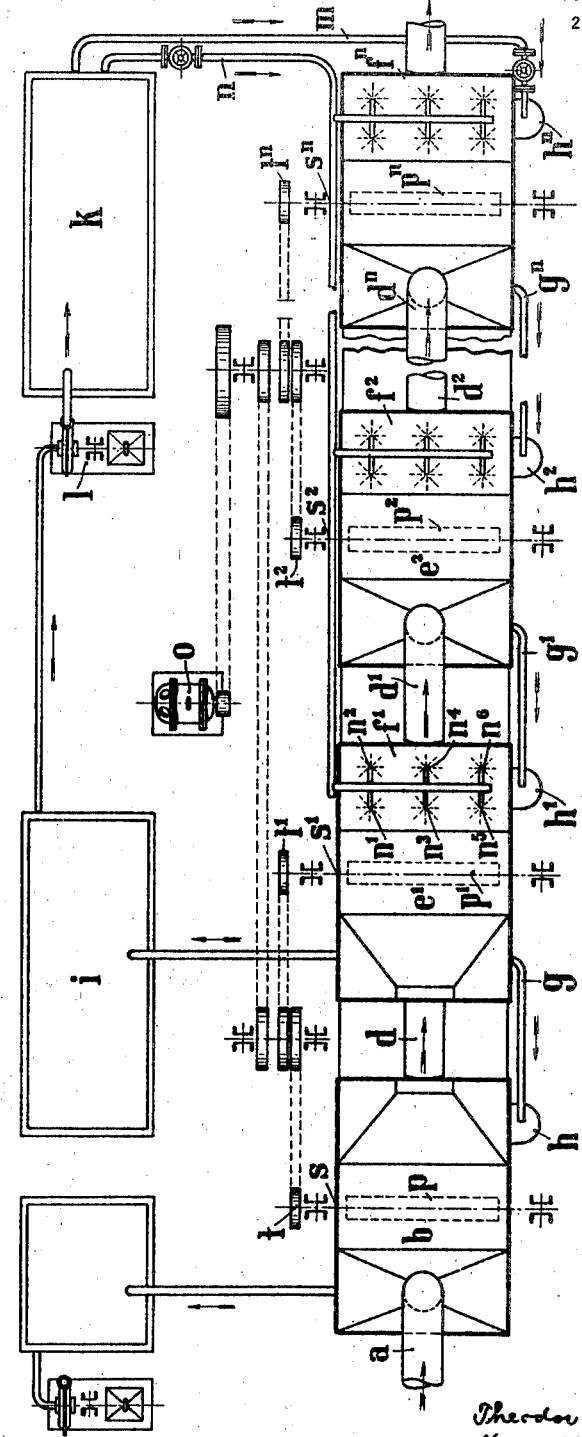

THEODOR SCHMIEDEL, OF NÜRNBERG-DOOS, AND HANS KLENCKE, OF FRANKFORT-ON-THE-MAIN, GERMANY, ASSIGNORS TO ED. GREUTERT & CIE., OF BASEL, SWITZERLAND.

PROCESS FOR THE PRODUCTION OF SULFURIC ACID WITHOUT CHAMBERS AND TOWERS.

1,399,526.     Specification of Letters Patent.     Patented Dec. 6, 1921.

Application filed August 13, 1920. Serial No. 403,417.

*To all whom it may concern:*

Be it known that we, THEODOR SCHMIEDEL, diploma'd engineer, and HANS KLENCKE, diploma'd engineer, citizens of the German Republic, residing at Nürnberg-Doos, Herterstrasse 3, and Frankfort-on-the-Main, Schwanthalerstrasse 72, respectively, have invented certain new and useful Improvements in Processes for the Production of Sulfuric Acid Without Chambers and Towers, (for which I have filed applications in Germany, Aug. 8, 1919; Austria, Oct. 16, 1919; Sweden, Nov. 25, 1919; Norway, Nov. 25, 1919; Czechia, Dec. 20, 1919; France, Mar. 4, 1920; Italy, Mar. 27, 1920; England, Mar. 31, 1920; Belgium, Apr. 2, 1920; Holland, Apr. 9, 1920; Spain, Apr., 1920; Switzerland, Apr., 1920; Hungary, Apr., 1920,) of which the following is a specification.

This invention relates to a process for the production of sulfuric acid without chambers and towers.

The production of sulfuric acid from gases containing sulfurous acid (roasting-furnace gases and the like) has—apart from the so-called contact process—never been carried out on a large scale without using lead chambers or towers. Although a number of proposals have already been made for the production of sulfuric acid without chambers and towers, these proposals have not led to any practical result, principally because with the proposed means no really intensive gas liquid reaction could be obtained, since for this purpose the gas containing sulfurous acid must be brought into intimate contact as quickly as possible, with a constantly renewable exceedingly large quantity of finely divided nitrosyl acid. By an extremely large amount of nitrous acid is to be understood an amount so large that in contact with any $SO_2$ content occuring in the plant the power of the nitrosyl acid to oxidize $SO_2$ is maintained unconditionally, therefore, there is no nitrosyl acid in the plant which is so weak as to be inactive. Furthermore it is necessary to keep the strength of the nitrosyl acid within certain limits, in order that on the one hand sufficient water for quick reaction may be present in the acid and on the other hand the capacity of the acid to contain nitrous gases and to take up nitrous gases that have been liberated may nevertheless be preserved.

According to the present invention, the problem of producing sulfuric acid without lead chambers and towers in an economical manner with proved success on a practical scale is solved by bringing into contact with the gases containing sulfurous acid, the largest possible amount of nitrosyl acid of between 54 and 58° Bé. strength, and in an extremely fine state of subdivision, in a mixing chamber, preferably by means of mechanical devices of any construction. The gases after having traversed the mixing device may be advantageously conducted through a chamber of moderate dimensions irrigated with nitrosyl acid of the same composition as that in the mixing chamber. By this means, the nitrous gases set free during the reaction in the mixing chamber have an opportunity of again exerting an oxidizing action on sulfurous acid, and are absorbed in the irrigating chambers to be returned in a dissolved condition to the mixing chamber, so that the proportion of nitrous contents in the acid there remains practically unaltered. One mixing chamber and one irrigation chamber alone or one mixing chamber form in themselves a working unit to which further units of the same kind may be attached as required. The mixing and irrigation chambers may be arranged in any way, provided the mixing chambers in particular are adapted to enable the most intimate possible contact of large amounts of acid with the gases in a short time. The most suitable devices for this purpose are such as are described in the co-pending application for Letters Patent of Theodor Schmiedel, Serial No. 403,414, filed August 13, 1920.

There have already been disclosed processes for manufacturing sulfuric acid with the use of the customary lead chambers or reaction towers in which the $SO_2$ containing gases are brought into contact and into reaction with nitrosyl sulfuric acid by the help of mechanical mixing devices. In all these processes, however, the $SO_2$-containing gases are brought together with the nitrosyl acid in counter current, and these gases completely de-nitrate the nitrosyl acid, whereby nitrogen oxid gases enter into the gas mixture, while sulfuric acid free from nitrogen oxid remains behind or runs away. The nitrogen oxid gases originating in the gas, however, are absorbed, after the $SO_2$ content of the gas mixture has practically completely disappeared, by pure sulfuric acid. Thus in all these known processes in the initial part of the plant where the fresh $SO_2$ containing gases enter it, there is found denitrated sulfuric acid. Furthermore the nitrogen oxid content of the acid increases until at the point where the $SO_2$ content of the gases is approximately zero, it reaches its highest value. Thereafter the nitrogen oxid content of the acid decreases again until the end of the plant, because there sulfuric acid free from nitrogen oxid is yielded.

In contrast to this in the present process, the plant at the beginning, in the middle, and at the end, that is, in all stages of the process is provided with nitrosyl sulfuric acid of the same nitrogen oxid content and in such amounts that everywhere in the plant nitrosyl acid capable of reacting is present and runs away. The nitrosyl acid running away from the individual mixing devices differs somewhat in its nitrogen oxid content; it is collected and mixed and immediately returned into the circuit. Only so much nitrosyl acid as about corresponds to the daily production of the plant of sulfuric acid is drawn off and denitrated to form commercial acid. This denitration, however, does not belong to the carrying out of the reaction in the present process, but can take place separately, for example, in the Glover tower of a chamber system. Because in the present process in all parts of the plant where sulfuric acid formation takes place, especially however in the first part where large amounts of $SO_2$ are still present, the nitrosyl acid is never denitrated to inactivity, there is obtained in combination with the fine subdivision of the nitrosyl acid a hastening of the oxidation of the $SO_2$ content of the gas hitherto never reached, and with it the practical possibility of producing sulfuric acid in relatively small mechanical mixing devices on a large factory scale.

In order to clearly understand the invention, reference is made to the accompanying drawings which shows by way of example a plant consisting of several mixing and irrigation devices.

Figure 1 is an elevational view and Fig. 2 is a plan view of the plant.

$a$ is the inlet pipe for the gases containing sulfurous acid, for instance, ordinary roasting-furnace gases from pyritic zinc blende and the like, or also pure or waste gases from metallurgical or chemical processes. $b$ is a proposed denitrating chamber, which, however, does not necessarily have to be connected to the plant according to the invention; it is only preferable to insert it at this place. $d$ is a connecting pipe leading from the denitrating chamber to the first mixing chamber $e'$. The mixing chamber may be arranged in a variety of ways, all that is necessary being that the means employed shall effect the most intimate possible contact between the nitrosyl and gases. The mixing chamber according to the drawing consists of a box-like acid-proof and gas-tight receptacle which is filled about one half with a solution of nitrosyl acid in sulfuric acid. Each mixing chamber is provided with a roller $p^2$, $p^n$, etc., of acid-proof material, rotatably mounted and just touching the acid with its periphery or dipping slightly therein. A driving pulley $t$ to $t^n$, is mounted on the elongated spindle $s$ to $n$ of the roller. The nitrosyl acid is centrifuged in the form of a fine spray into the gas chamber over the roller by the rapid revolution so that the gases passing therethrough come into intimate contact with said spray. Part of the gases are drawn into the nitrosyl by means of the roller and issue behind said roller, to reunite with the gases passing over the roller. Above the mixing chamber $e'$ is a container $f'$ charged with filling material which is irrigated with acid through the inlet pipe $n'$ to $n^6$, which acid runs into the mixing chamber $e'$. The gases leaving the mixing chamber are thus forced to pass through the irrigating chamber $f'$ and thence through the communication pipes $d'$ into the next mixing chamber $e^2$, with adjoining irrigation chamber $f^2$, and so on as required. The mixing chambers and accessories are arranged in cascade form in such way that the acid flows by itself from the uppermost mixing chamber down the lowest, by way of the overflow pipes $g^n$, $g^2$, $g'$, etc., and the inlet funnels $h^n$, $h^2$, $h'$, etc., provision being made for keeping the acid at uniform level by suitably adjusting the overflows. The acid comes from the mixing chamber $e'$ into the acid circulation tank $i$ from which it is raised by the pump $l$ into a high level tank $k$. From this it flows partly through the pipe $m$ into the uppermost mixing chamber and partly through the pipe $n$ to the several irrigation chambers. An amount of nitrosyl acid corresponding to the daily production is diverted from the mixing chamber $e'$ into the denitrating chamber $b$ and from thence is conducted, in a denitrated condition, to the place of consumption.

The individual rollers in the mixing chambers are driven by the motor $o$ by means of belting. Instead of arranging the several chambers and tanks in cascade form, they may also be arranged on the same level. In this case the supply of acid to the irrigation chambers and its removal from the mixing chambers are effected in parallel.

The method of working is as follows:

Nitrosyl acid of uniform composition is passed continuously through the mixing and irrigation chambers, water or nitric acid in desired amounts being added in order to maintain the nitrosyl acid constantly at the required strength of 56° Bé. and at a suitable concentration in nitrosyl, the composition being always in a state of change through the absorption of the generated sulfuric acid and through the normal loss of oxids of nitrogen. The drive of the rollers of the mixing chambers is started so that the gas space above the rollers is filled with a fine nitrosyl spray.

As soon as gases containing sulfurous acid of any strength whatsoever, hot or cold, encounter the very fine spray of nitrosyl acid (of about 56° Bé. strength) in the first mixing chamber a very brisk reaction is set up at once between the two in consequence of the exceedingly great opportunity afforded for contact. That part of the gases which is forced in an extremely fine state of division into the nitrosyl by the roller is entirely oxidized therein.

The result of this action is that a considerable part (up to 50% of the sulfurous acid) is oxidized in the first mixing chamber and that a corresponding amount of nitrosyl gases enter the gas mixture. Inasmuch as the gas mixture was in contact with comparatively strong sulfuric acid its percentage of water has become too small for further oxidation to take place in the form of a normal gas reaction, and a tendency is set up for the formation of nitrosyl-sulfuric acid or the deposition of chamber crystals. This is prevented by the gas mixture being now wetted in the intermediate chamber connected to the mixing chamber, with nitrosyl of the same concentration as that of the mixing chamber whereby nitrosyl-sulfuric acid is dissolved and the reaction between gas and liquid is again rendered possible. At the same time the irrigating acid redissolves the nitrous gases liberated in the mixing chamber and returns them into the mixing chamber so that its stock of nitrosyl is essentially maintained.

One mixing chamber and one irrigating chamber thus form a complete aggregation which, given a slow flow of gas, is adapted to carry out the acid-forming process by working up the $SO_2$ gases and recovering the nitrogen-oxygen compounds. Consequently it is not always necessary to pass the acid in a single current against the gases but the mixing and irrigation chambers may be supplied in parallel with acid of uniform composition. Therefore, if desired, the repeated circulation of acid, hitherto essential in chamber and tower systems, may be dispensed with. The practical advantage of this circumstance is that the quantity of acid and therefore of nitrosyl supplied to the individual mixing chambers connected in parallel to the acid supply can, if desired, be varied at any time and independently for each. The gas mixture leaving the irrigation chamber is passed, if necessary, through further mixing chambers alternating with irrigation chambers until the content in sulfurous acid is almost completely exhausted. Since, in this method of working the content of nitrous gases in the gas mixture at any time corresponds only to the amount of sulfurous acid coming into action at a given point, both the sulfurous acid and the gaseous nitrosyl have disappeared from the final gases, at the end of the system. These gases can, therefore, immediately be discharged into the open air.

For the production of commercial acid, an amount of nitrosyl acid which corresponds to the daily production must be denitrated. This is effected by setting up in front of the first mixing chamber a similarly constructed denitrating chamber into which part of the nitrosyl acid is admitted and from which the gas mixture is passed into the first mixing chamber proper, without passing through an irrigation chamber. The denitrated acid is drawn off separately and stored.

In this way a large quantity of sulfuric acid can be produced in a small space and with a comparatively small consumption of nitric acid and power. Since the prime cost of the plant is small, extensive buildings such as chambers and towers, being dispensed with, a highly important improvement is constituted by the new process on this account as well.

Having now particularly described and ascertained the nature of our said invention and in what manner the same is to be performed, we declare what we claim is:

1. A process for manufacturing sulfuric acid without the customary lead chambers or reaction towers, comprising the bringing together of a solution of nitrosyl sulfuric acid in sulfuric acid in very fine subdivision, and $SO_2$-containing gases with the help of one or more mechanical mixing devices, the solution being used in an amount such that at no point in the plant does the solution, as a result of the denitration lose its power of oxidizing $SO_2$.

2. The process for manufacturing sulfuric acid without the customary lead chambers or reaction towers comprising the bringing together of a solution of nitrosyl sulfuric acid in sulfuric acid in a fine state of subdivision, and $SO_2$-containing gases, with the help of one or more mechanical mixing devices, the solution being used in an amount such that at no point in the plant does it lose its power to oxidize $SO_2$ as the result of denitration, and the bringing back into the circuit of the solution which is passing out of the plant, while an amount of the solution corresponding to the production of sulfuric acid is separated and completely de-nitrated to form commercial acid.

3. The process for the manufacture of sulfuric acid without the customary lead chambers or reaction towers, comprising the bringing together of a solution of nitrosyl sulfuric acid in sulfuric acid in a very fine state of sub-division, and $SO_2$-containing gases, with the mechanical help of one or more roller devices, the solution being used in sufficient quantity such that at no place in the plant does the solution lose its power to oxidize $SO_2$ as a result of denitration, and the bringing back into the circuit through the plant of the solution flowing away out of the plant, while an amount of the solution corresponding approximately to the production of sulfuric acid is separated out and completely denitrated to form commercial acid.

4. The process for manufacture of sulfuric acid without the customary lead chamber or reaction towers comprising the bringing together of a solution of nitrosyl sulfuric acid in sulfuric acid in a fine state of subdivision, and $SO_2$-containing gases, with the help of one or more mechanical mixing devices, wherein the gas is conducted behind each mixing device and through a space which is sprayed with the same solution, the solution being used in an amount such that at no place in the plant does the solution lose its power to oxidize $SO_2$ as a result of the denitration and the returning of the solution flowing away out of the plant into circulation through the plant, while an amount of the solution corresponding to the production of sulfuric acid is separated and completely denitrated into commercial acid.

5. The process for manufacturing sulfuric acid without the customary lead chambers or reaction towers, comprising the bringing together of nitrosyl sulfuric acid in sulfuric acid in a fine state of subdivision, and $SO_2$ containing gases, with the use of one or more roller devices wherein the gas is conducted behind each mixing device and through the solution being used in an amount such that at no place in the plant does the solution, as a result of denitration, lose its power to oxidize $SO_2$, and the return of the solution flowing away out of the plant into circulation through the plant, while an amount of the solution approximately corresponding to the production of sulfuric acid is separated and completely denitrated to form commercial acid.

6. The process for the manufacture of sulfuric acid without the customary lead chambers or reaction towers, consisting in the bringing together of a solution of nitrosyl sulfuric acid in sulfuric acid in a fine state of sub-division with $SO_2$-containing gases with the use of one or more roller devices, wherein the gas is conducted behind each mixing device and through a box-like space, where it is sprayed with the same solution, the solution being used in an amount such that at no point in the plant does the solution lose its power to oxidize $SO_2$ as a result of denitration, and the return of the solution flowing away out of the plant into circulation through the plant, while an amount of the solution approximately corresponding to the production of the sulfuric acid is separated and is completely denitrated in a de-nitrator, which is connected to the first mixing device, by the fresh $SO_2$-containing gas to form commercial acid.

In testimony whereof we affix our signatures in presence of two witnesses.

THEODOR SCHMIEDEL.
HANS KLENCKE.

Witnesses:
ROBERT ENGLER,
LUDVIG SCHMIDTWEY.